No. 873,049. PATENTED DEC. 10, 1907.
J. IRVING, Jr.
ASH SIFTER.
APPLICATION FILED AUG. 9, 1907.
2 SHEETS—SHEET 1.
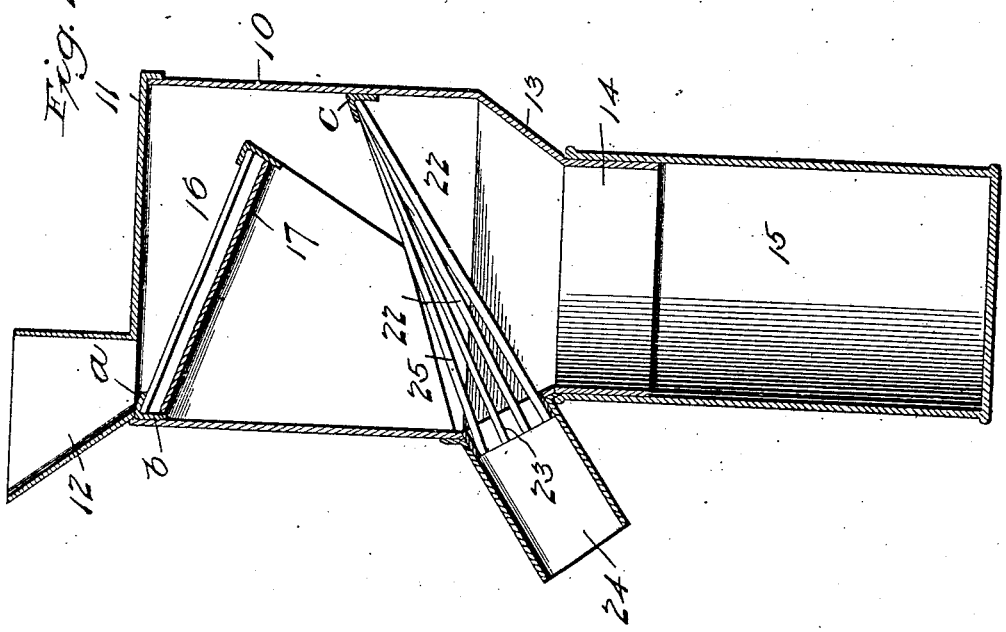
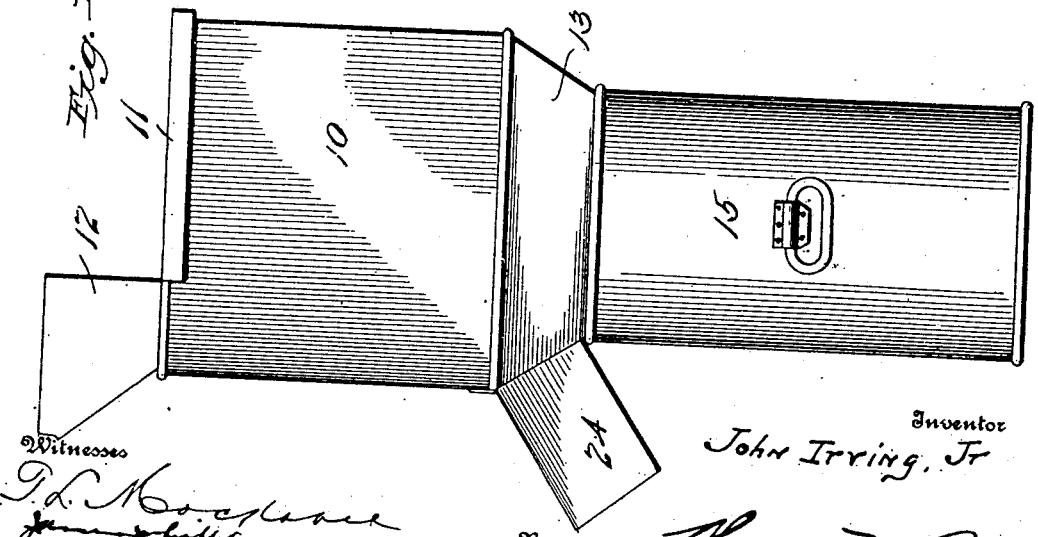
Inventor
John Irving, Jr

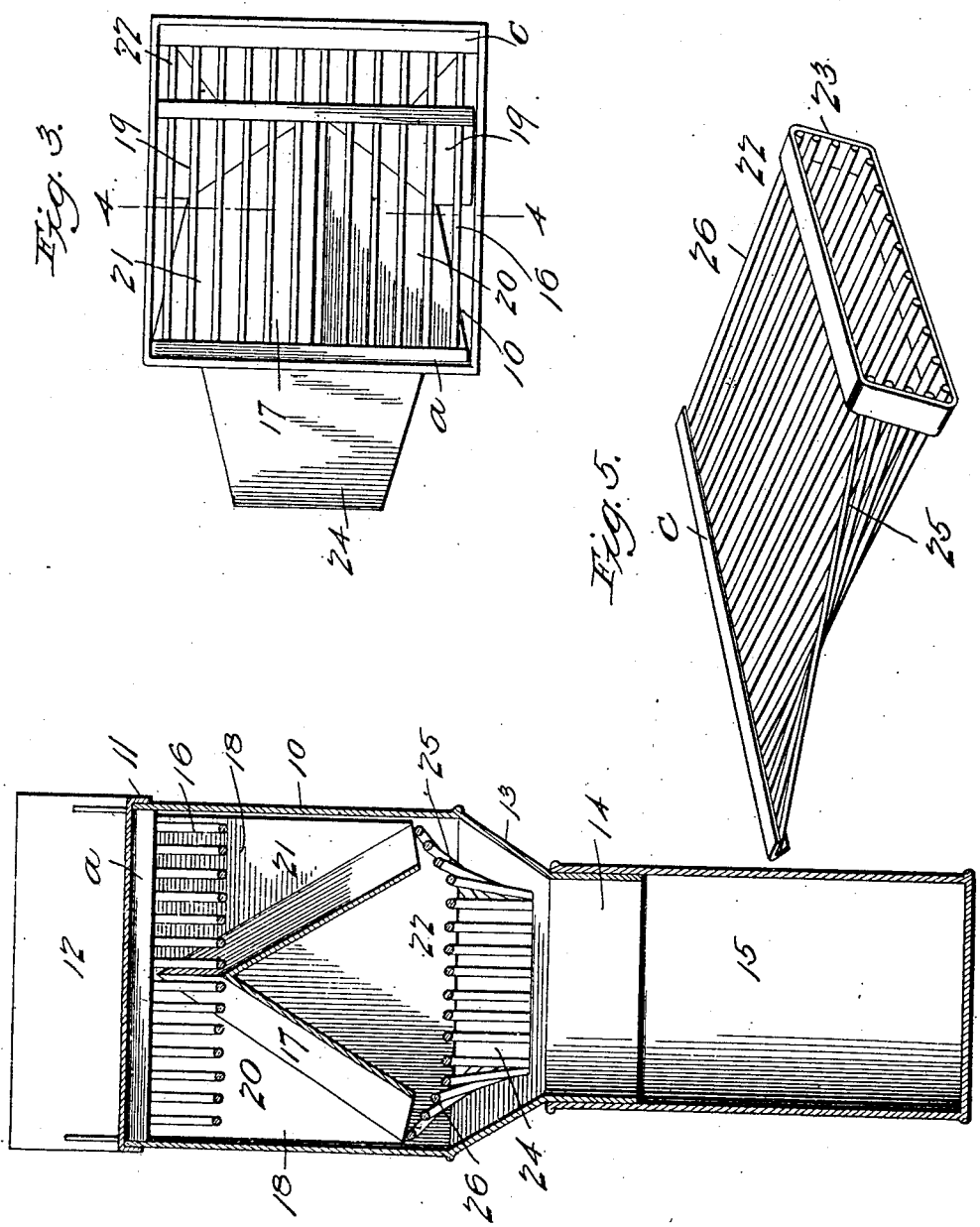

UNITED STATES PATENT OFFICE.

JOHN IRVING, JR., OF NEW BRIGHTON, NEW YORK.

ASH-SIFTER.

No. 873,049.     Specification of Letters Patent.     Patented Dec. 10, 1907.

Application filed August 9, 1907. Serial No. 387,912.

*To all whom it may concern:*

Be it known that I, JOHN IRVING, Jr., a citizen of the United States, and a resident of New Brighton, Staten Island, in the county of Richmond and State of New York, have invented certain new and useful Improvements in Ash-Sifters, of which the following is a specification.

The present invention consists in certain new and useful improvements in ash sifters, and has special relation to that type of ash sifters known as gravity sifters.

The principal object of the invention is to provide a novel form of sifter in which the arrangement of screens and chutes is such that the ashes will be thoroughly separated from the cinders, and will be conveyed to an ash receptacle in communication with the lower part of the sifter, and the cinders will be conveyed to a cinder outlet at the side of the said sifter body.

Other and further objects and advantages will be apparent from the following detailed description when taken in connection with the accompanying drawings.

Referring to the accompanying drawings, in which like characters of reference refer to corresponding parts,—Figure 1 is a side elevation of the ash sifter. Fig. 2 is a longitudinal sectional view. Fig. 3 is a top plan view, the cover being removed. Fig. 4 is a transverse sectional view on line 4—4 of Fig. 3. Fig. 5 is a detail view of the cinder conveying chute.

Referring to the drawings, 10 designates the ash separating chamber and 11 a cover therefor. A hopper 12 is carried by said cover, said hopper being preferably located adjacent to one edge thereof. The lower portion of said separating chamber 10 is provided with a contracted bottom 13, terminating in a depending tubular discharging neck 14, which is of a size to permit of being fitted within the open upper end of a suitable ash receptacle 15.

Within the separating chamber 10, and secured to the upper edge thereof, is a downwardly inclined separating screen 16, having depending therefrom an inverted V-shaped deflector 17. Said deflector 17 is provided with vertical guard flanges 18—19 which project from the inclined side edges of the said V-shaped deflector, the arrangement being such that oppositely extending, downwardly inclined chutes 20—21 are provided below the said separating screen 16.

By reference to Fig. 2 of the drawings it will be observed that the lower end of the inclined separating screen 16 does not extend entirely across the separating chamber 10, a space being left between said end and the rear wall of the said chamber to admit of the fall of cinders at this point. Secured to the rear wall of the separating chamber 10, at a point just below the lower, inner discharging end of the separating screen 16, is a cinder conveying screen 22, which is inclined in a direction opposite to that of said separating screen 16. The lower end of said cinder conveying screen 22 is attached to a rectangular supporting frame 23, which is detachably and snugly fitted within the entrance of a cinder outlet chute 24, carried by and projecting outwardly from the side portion of the separating chamber 10. By reference to Fig. 5 of the drawings it will be observed that the said cinder conveying screen 22 is provided with upturned side flanges 25—26 which increase in height as they approach the lower end of said screen, at which point they are of the same height as the height of the said frame 23, to which their ends are secured.

The separating screen 15 is preferably formed of spaced wire rods that are all arranged in the same plane and have their ends secured to a strip of sheet metal $a$ which is provided with a depending flange $b$, to the lower portion of which the side guard flanges 18—18 of the chutes 20—21 are fastened. The upper portion of said flange 1 is attached to the side of the separating chamber 10 by means of rivets or other suitable fastening means, and forms the means whereby said screen 15 and its chutes 20—21 are held in their operative positions.

The cinder conveying screen is also preferably formed of spaced apart wire rods, the upper ends of which are fastened to a strip of sheet metal $c$, which in turn is securely fastened to the side of the separating chamber 10, just below the lower end of the separating screen 10. The lower ends of the wire rods are fastened to the bottom and sides of the rectangular frame 23 so as to provide the side guards 25—26 which at their lower ends are of a height substantially the same as the height of the said rectangular frame 23, from which point they gradually decrease in height until they reach the upper ends where they are all in substantially the same plane.

While in the foregoing description I have referred to the separating screen 16 and the cinder conveying screen 22 as being formed of wire rods, it will be understood that such construction is the preferred one, but there is no intention of limiting the invention to such form of screens, for it will be obvious that the same may be formed of meshed wire fabric, or other foraminous material.

In using the ash sifter the material is poured into the hopper 12 and drops onto the upper inclined separating screen 16. In sliding down said separating screen, the material is sifted, the ashes falling through the screen and onto the chutes 20—21, from which it drops down through the tubular discharge neck 14 and into the ash receptacle 15. The cinders fall over the lower end of the separating screen 16 onto the cinder conveying screen 22 and slide down it and through the outlet chute 24, where they are received in a suitable receptacle (not shown). During the passage of the cinders down the screen 22, all ashes or the like are thoroughly separated therefrom and drop through the screen and into the ash receptacle.

From the foregoing description it will be seen that the material to be sifted undergoes two separate and distinct screen operations, the first by means of the upper separating screen, and the second by means of the lower cinder conveying screen. And it will be seen that as the two inclined chutes 20—21 straddle the lower cinder conveying screen, the material passing down said chutes will be conducted away from said screen, all danger of the material falling over the sides of said chutes being overcome by means of the side guard flanges 18—19.

I claim as my invention:—

1. An ash sifter consisting of a separating chamber having a bottom discharge neck adapted to be fitted within an ash receptacle, an upper inclined screen having depending therefrom inclined chutes provided with guard flanges, a lower screen inclined in a direction opposite to that of said upper screen, and an outlet chute with which said lower screen communicates.

2. An ash sifter consisting of a separating chamber provided with a contracted lower portion terminating in a tubular discharge neck, oppositely arranged inclined screens within said separating chamber, said screens being located one above the other, chutes depending from the upper of said screens and provided with vertical guard flanges, the lower screen being provided with upturned sides, and an outlet chute with which the lower of said screens is in communication.

3. An ash sifter consisting of a separating chamber provided with a contracted lower portion terminating in a depending tube, a cover for said separating chamber provided with a hopper, oppositely arranged inclined screens within said separating chamber, said screens being located one above the other, oppositely inclined chutes provided with guard flanges depending from the upper screen and straddling the lower screen, flanges carried by said lower screen, and an outlet chute with which the lower screen is in communication.

4. An ash sifter consisting of a separating chamber, an upper screen, a lower screen provided with an end supporting frame and having its sides upturned to form tapering flanges, and inclined chutes carried by said upper screen and being provided with guard flanges and having their lower ends arranged to straddle the lower screen.

5. An ash sifter consisting of a separating chamber, an upper screen, a lower screen inclined in a direction opposite to that of the upper screen and provided with a rectangular end supporting frame and having its sides upturned to form flanges which decrease in height as they approach the upper end of said screen, and oppositely inclined chutes provided with vertical guard flanges carried by said upper screen and having their lower ends arranged to straddle said lower screen.

Signed at New York in the county of New York and State of New York this first day of August, A. D. 1907.

JOHN IRVING, Jr.

Witnesses:
EGBERT V. NELSON,
JAMES PHILLIPS.